(12) United States Patent
Park (10) Patent No.: US 11,324,356 B2
(45) Date of Patent: May 10, 2022

(54) APPARATUS FOR MANUFACTURING BEVERAGE

(71) Applicant: CUCHEN CO., LTD., Seoul (KR)

(72) Inventor: Sang Wook Park, Seoul (KR)

(73) Assignee: CUCHEN CO., LTD., Seoul (KR)

( * ) Notice: Subject to any disclaimer, the term of this patent is extended or adjusted under 35 U.S.C. 154(b) by 370 days.

(21) Appl. No.: 16/368,130

(22) Filed: Mar. 28, 2019

(65) Prior Publication Data

US 2020/0022528 A1 Jan. 23, 2020

(30) Foreign Application Priority Data

Jul. 17, 2018 (KR) .......................... 10-2018-0083132

(51) Int. Cl.
*A47J 31/46* (2006.01)
*F28D 1/00* (2006.01)

(52) U.S. Cl.
CPC ........... *A47J 31/461* (2018.08); *A47J 31/468* (2018.08); *F28D 1/00* (2013.01)

(58) Field of Classification Search
CPC ........ A47J 31/461; A47J 31/468; A47J 31/46; A47J 31/36; A47J 31/44; A47J 31/54; A47J 31/4489; A47J 31/441; A47J 31/4403; A47J 31/4485; A47J 29/02; A47J 531/46; F24H 1/162; F28D 1/00; H05B 1/0269; H05B 2203/021; H05B 3/48
See application file for complete search history.

(56) References Cited

U.S. PATENT DOCUMENTS

| | | | | |
|---|---|---|---|---|
| 2,673,920 A | * | 3/1954 | Donovan | A47J 31/542 392/484 |
| 5,778,765 A | * | 7/1998 | Klawuhn | A47J 31/469 99/290 |
| 10,743,705 B2 | * | 8/2020 | Glucksman | A47J 31/5251 |
| 2003/0066430 A1 | | 4/2003 | Bitar et al. | |
| 2003/0232115 A1 | * | 12/2003 | Eckenhausen | A47J 31/4485 426/477 |
| 2010/0112152 A1 | * | 5/2010 | Sinnema | A47J 31/56 426/248 |

(Continued)

FOREIGN PATENT DOCUMENTS

| | | |
|---|---|---|
| CN | 1411775 | 4/2003 |
| CN | 101097086 | 1/2008 |

OTHER PUBLICATIONS

Office action issued to corresponding Chinese Application No. 201910115809.1, dated Jan. 27, 2021 and English translation.

(Continued)

*Primary Examiner* — Joel M Attey
*Assistant Examiner* — Adam Michael Eckardt
(74) *Attorney, Agent, or Firm* — Burris & Law, PLLC (57) ABSTRACT

Provided is an apparatus for manufacturing beverage. The apparatus includes a heat exchanger to heat a fluid. The heat exchanger includes a body including a first end portion and a second end portion, and the second end portion is opposite to the first end portion. The apparatus further includes a heater embedded in the body, a first pipe installed in the body and guiding the fluid in a first direction from the first end portion of the body to the second end portion of the body, and a second pipe installed in the body and guiding the fluid output from the first pipe in a second direction opposite to the first direction.

4 Claims, 12 Drawing Sheets

(56) References Cited

U.S. PATENT DOCUMENTS

2016/0235243 A1* 8/2016 Grassia .............. A47J 31/4489
2016/0338527 A1* 11/2016 Burrows ................ A47J 31/56
2019/0274472 A1* 9/2019 Epping .................. A47J 31/60

OTHER PUBLICATIONS

Office Action issued in corresponding Korean patent application 10-2018-0083132, dated Jul. 27, 2020.

* cited by examiner

APPARATUS FOR MANUFACTURING BEVERAGE

CROSS-REFERENCE TO RELATED APPLICATION

This application claims the benefit of Korean Patent Application No. 10-2018-0083132, filed on Jul. 17, 2018, in the Korean Intellectual Property Office, the disclosure of which is incorporated herein in its entirety by reference.

BACKGROUND

1. Technical Field

One or more embodiments relate to an apparatus for manufacturing beverage, and more particularly, to an apparatus for manufacturing beverage including a heat exchanger.

2. Related Art

In general, various beverages such as black tea, green tea, coffee, etc. that can be drunk by brewing can be obtained by drying various natural cultivated plants in a natural state and then extracting the unique flavor contained in the plants in the form of beverage, and have been widely taken by modern people as favorite food.

Recently, apparatuses for manufacturing beverages such as coffee or tea are being developed according to an increase in the demand for the beverage. For example, capsule coffee machines are apparatuses using the principle of making espresso by applying hot water with pressure to ground coffee beans contained in a capsule, thereby extracting coffee. The capsule coffee machines are recently widely used for their convenient coffee extraction process and a low price.

SUMMARY

One or more embodiments include an apparatus for manufacturing beverage including a heat exchanger that effectively heats a fluid.

Additional aspects will be set forth in part in the description which follows and, in part, will be apparent from the description, or may be learned by practice of the presented embodiments.

According to one or more embodiments, there is provided an apparatus for manufacturing beverage, the apparatus including a heat exchanger to heat a fluid, in which the heat exchanger includes a body including a first end portion and a second end portion, the second end portion being opposite to the first end portion, a heater embedded in the body, a first pipe installed in the body and guiding the fluid in a first direction from the first end portion of the body to the second end portion of the body, and a second pipe installed in the body and guiding the fluid output from the first pipe in a second direction opposite to the first direction.

The apparatus may further include a connection tube connecting an outlet of the first pipe to an inlet of the second pipe.

The first pipe may extend in a helical shape between the first end portion of the body and the second end portion of the body, and the second pipe may extend in a helical shape between the first end portion of the body and the second end portion of the body.

The heater may be between the first pipe and the second pipe and may extend in a helical shape between the first end portion of the body and the second end portion of the body.

A helical diameter of the heater may be greater than a helical diameter of the first pipe and less than a helical diameter of the second pipe.

The heat exchanger may further include a temperature sensor installed in the body.

According to one or more embodiments, there is provided an apparatus for manufacturing beverage, which includes a container configured to accommodate water, a first valve connected to the container via a first flow path for guiding a fluid output from the container and to outside air via an air inflow path, a second valve connected to the first valve via a second flow path for guiding the fluid output from the first valve, and an ejector connected to the second valve via an ejection flow path for guiding the fluid output from the second valve and configured to eject the fluid, in which the first valve includes a flow path switching valve configured to allow a flow of water through the first flow path or air through the air inflow path that communicates with the outside air.

The apparatus may further includes a heat exchanger installed on the second flow path for connecting the first valve to the second valve and configured to heat the fluid in an instant heating method.

The apparatus may further include a heat exchanger configured to detect a temperature of the fluid output from the heat exchanger.

The apparatus may further include a circulation flow path for connecting the second valve to the container and guiding the fluid output from the second valve to flow toward the container.

The second valve may include a flow path switching valve configured to allow the air input to the second valve to be output through the ejection flow path or to the circulation flow path.

According to one or more embodiments, there is provided an apparatus for manufacturing beverage, which includes a container, a valve connected to the container through a flow path for guiding a fluid output from the container, an ejector connected to the valve via an ejection flow path for guiding the fluid output from the valve and configured to eject the fluid, a circulation flow path connecting the valve to the container and guiding the fluid output from the valve to the container, and a controller configured to control the valve, in which the valve includes a flow path switching valve configured to allow the fluid input to the valve to be output through the ejection flow path or the circulation flow path.

The apparatus may further include a heat exchanger installed on the flow path, and a temperature sensor configured to detect a temperature of the fluid output from the heat exchanger.

When temperature of the fluid detected by the temperature sensor is out of a preset temperature range, the controller may be further configured to drive the valve to allow the fluid to flow through the circulation flow path.

The apparatus may further include a pressure sensor configured to detect pressure in the ejection flow path.

When the pressure detected by the pressure sensor is out of a preset pressure range, the controller may be further configured to drive the valve to allow the fluid to be output through the circulation flow path.

The apparatus may further include a heat exchanger installed on the flow path, a temperature sensor configured to detect a temperature of the fluid output from the heat exchanger, and a pressure sensor configured to detect pressure in the ejection flow path.

The valve may include a first outlet and a second outlet both connected to the circulation flow path, in which the controller is further configured to drive the valve to open the first outlet when the temperature of the fluid detected by the temperature sensor is out of a preset temperature range, and the second outlet when the pressure detected by the pressure sensor is out of a preset pressure range.

The apparatus may further include a fluid selection valve installed on the flow path connecting the container to the valve, in which the fluid selection valve includes a flow path switching valve configured to allow flow of water output from the container or outside air through an air inflow path that communicates with the outside air.

The apparatus may further include a check valve installed on the ejection flow path and configured to prevent backflow of the fluid in the ejection flow path.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout and redundant descriptions thereof are omitted.

Figure 1:
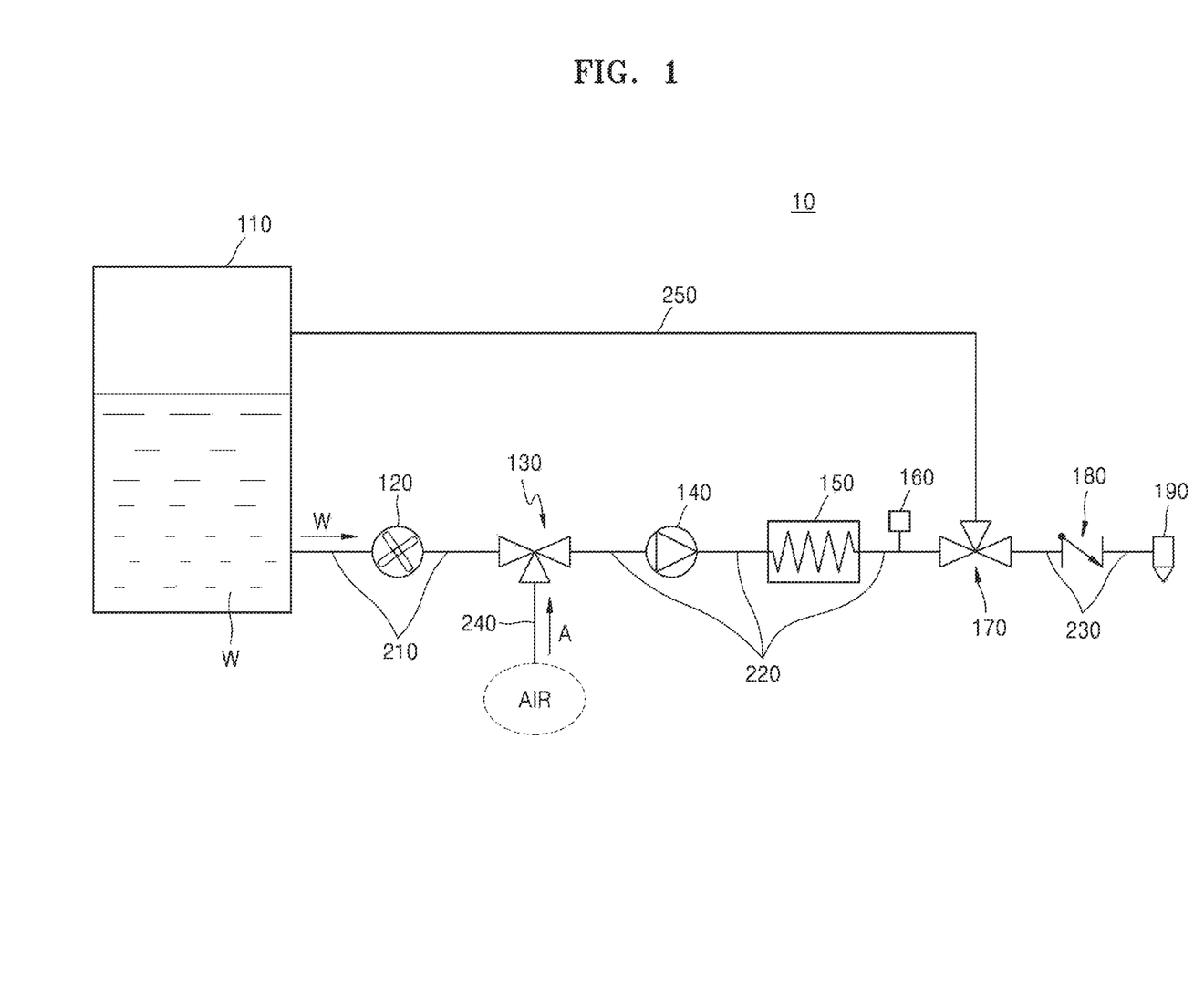
FIG. 1 schematically illustrates a configuration of an apparatus for manufacturing beverage according to an embodiment.

FIG. 1 schematically illustrates a configuration of a beverage manufacturing apparatus 10 according to an embodiment.

Referring to FIG. 1, the beverage manufacturing apparatus 10 may be an apparatus for ejecting water having a certain temperature and pressure. For example, the beverage manufacturing apparatus 10 may be a coffee machine for extracting liquid coffee using hot water or a tea manufacturing apparatus capable of brewing tea by ejecting hot water.

The beverage manufacturing apparatus 10 may include a container 110 for containing water W, a flow meter 120, a first valve 130, a pump 140, a heat exchanger 150, a second valve 170, a check valve 180, and an ejector 190. The beverage manufacturing apparatus 10 may include a flow path connecting the container 110, the flow meter 120, the first valve 130, the pump 140, the heat exchanger 150, the second valve 170, the check valve 180, and the ejector 190. For example, the beverage manufacturing apparatus 10 may include a first flow path 210 for sequentially connecting an outlet of the container 110, the flow meter 120, and the first valve 130; a second flow path 220 for sequentially connecting the first valve 130, the pump 140, the heat exchanger 150, and the second valve 170; an ejection flow path 230 for sequentially connecting the second valve 170, the check valve 180, and the ejector 190; and a circulation flow path 250 for connecting the second valve 170 to the container 110.

The first valve 130 may be connected to the outlet of the container 110 through the first flow path 210, and the outside air may be allow to flow through an air inflow path 240 connected to the outside air. The first valve 130 may include a flow path switching valve configured to selectively open or close a plurality of inflow ends. For example, the first valve 130 may be a solenoid valve. The first valve 130 may selectively allow a flow of any one of the water W and air A. The first valve 130 may be referred to as a fluid selection valve, considering that any one of the water W and the air A is selected.

In detail, the first valve 130 may selectively open or close an inlet connected to the first flow path 210 and an inlet connected to the air inflow path 240. For example, when the first valve 130 is at a first position where the inlet connected to the first flow path 210 is open, the water W may be output through the second flow path 220 connected to an outlet of the first valve 130. Alternatively, when the first valve 130 is at a second position where the inlet connected to the air inflow path 240 is open, the air A may be output through the second flow path 220 connected to the outlet of the first valve 130.

The flow meter 120 may be installed on the first flow path 210 connecting the container 110 to the first valve 130, and may detect a flow rate of the water W output from the container 110.

The pump 140 may provide a drive force to flow a fluid in a flow path of the beverage manufacturing apparatus 10. For example, as the pump 140 is driven, the water W or the air A may flow along the flow path provided in the beverage manufacturing apparatus 10 and may be discharged through the ejector 190. For example, the pump 140 may be configured to control the flow speed of the water W or the air A by adjusting a driving cycle, that is, an ON/OFF cycle.

The heat exchanger 150 may heat the fluid flowing along the second flow path 220 by an instant heating method. For example, the heat exchanger 150 may be configured to heat the water W output through the first valve 130 to be transferred toward the second valve 170, or to heat the air A output through the first valve 130 to be transferred toward the second valve 170.

The second valve 170 may be connected to the first valve 130 via the second flow path 220, to the ejector 190 via the ejection flow path 230, and to the inlet of the container 110 via the circulation flow path 250. The second valve 170 may include a flow path switching valve configured to selectively open or close a plurality of output ends. For example, the second valve 170 may be a solenoid valve. When the fluid is input through an inlet of the second valve 170, the second valve 170 may selectively output the input fluid to the ejection flow path 230 or the circulation flow path 250.

In detail, the second valve 170 may selectively open or close an outlet connected to the ejection flow path 230 and an outlet connected to the circulation flow path 250. For example, when the second valve 170 is at a first position where the outlet connected to the ejection flow path 230 is open, the water W or the air A may be output through the ejection flow path 230. Alternatively, when the second valve 170 is at a second position where the outlet connected to the circulation flow path 250 is open, the water W or the air A may be output through the circulation flow path 250.

Figure 8:
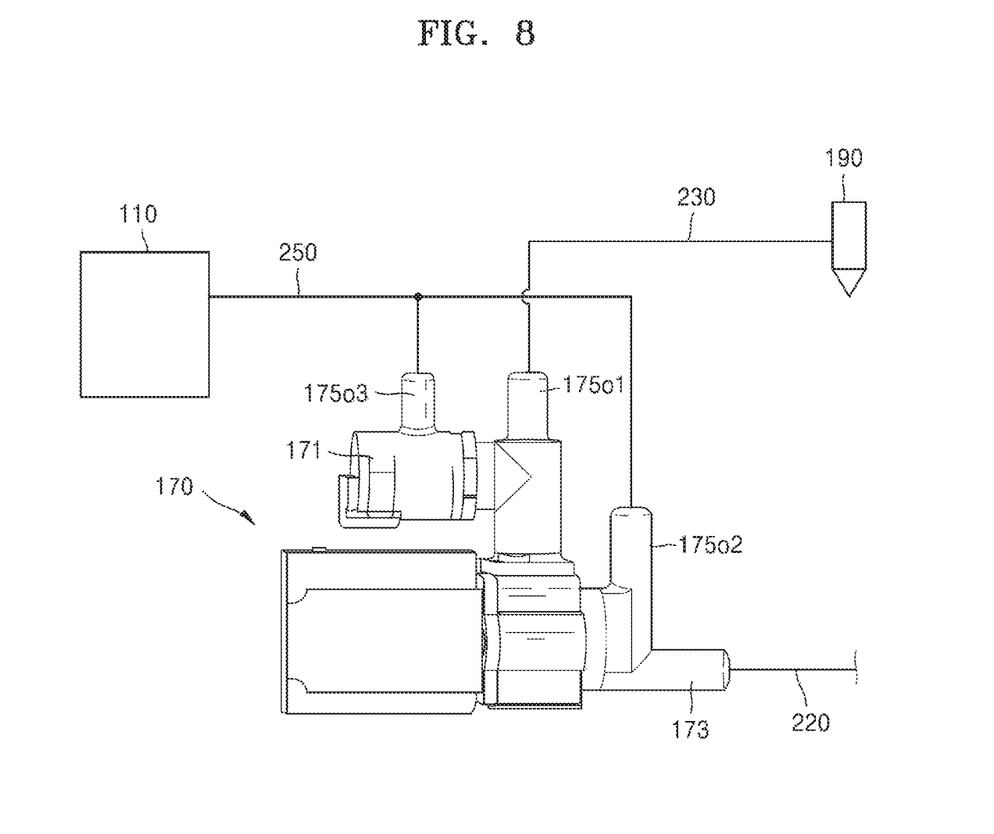
FIG. 8 is a perspective view of a second valve according to an embodiment.

In some embodiments, the beverage manufacturing apparatus 10 may include a pressure sensor configured to detect pressure in the flow path. For example, the pressure sensor may be used to detect the pressure of the ejection flow path 230. As illustrated in FIG. 8, a pressure sensor 171 may be provided in the second valve 170. However, contrary to the above description, the pressure sensor may be installed on the ejection flow path 230. The pressure sensor may detect the pressure in the flow path. Information about the pressure detected by the pressure sensor may be used to determine whether the pressure in the flow path is within a normal pressure range.

A temperature sensor 160 may be installed on the second flow path 220 connecting the heat exchanger 150 to the second valve 170. The temperature sensor 160 may detect the temperature of the water W output from the heat exchanger 150. Information about the temperature detected by the temperature sensor 160 may be used to determine whether the temperature of the water W heated by the heat exchanger 150 is within a normal temperature range.

The check valve 180 may be installed on the ejection flow path 230 around the ejector 190. The check valve 180 may prevent backflow of the fluid in the ejection flow path 230. The check valve 180 may allow the fluid to flow in a direction from the second valve 170 toward the ejector 190, but may prevent the fluid from flowing in a direction from the ejector 190 toward the second valve 170. For example, when the ejector 190 is clogged due to foreign materials, forming a high pressure in the ejector 190, the check valve 180 may prevent the fluid from flowing back toward the second valve 170 through the ejection flow path 230.

Although not illustrated in detail in the drawing, the beverage manufacturing apparatus 10 may include a controller (see 300 of FIG. 12) for controlling the flow meter 120, the first valve 130, the pump 140, the heat exchanger 150, the temperature sensor 160, and the second valve 170. For example, the controller may include a microprocessor or a communication module.

FIGS. 2 to 5 each illustrate an operation method of the beverage manufacturing apparatus 10 according to an embodiment.

Figure 2:
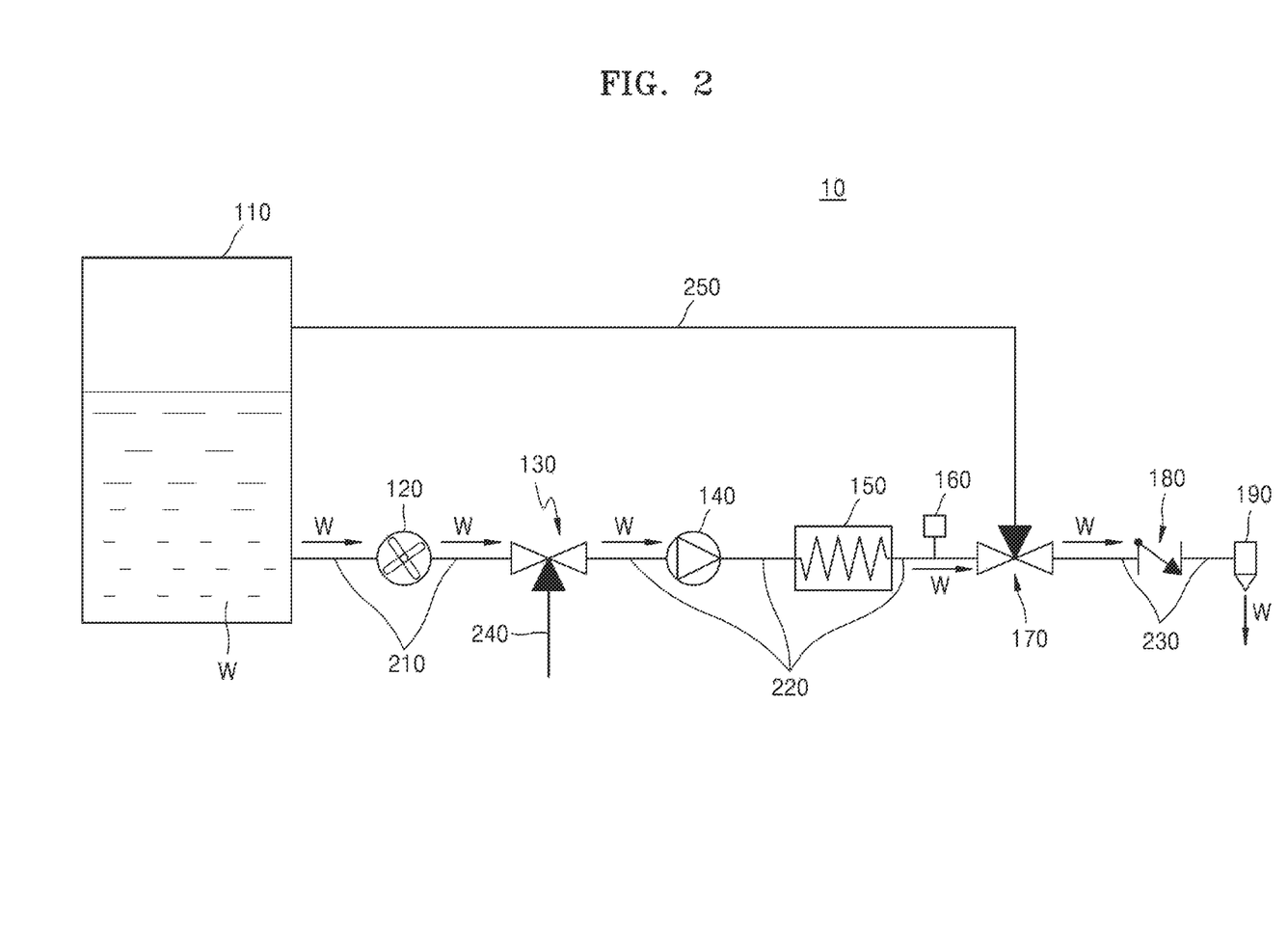
FIGS. 2 to 5 each illustrate an operation method of an apparatus for manufacturing beverage according to an embodiment.

Referring to FIG. 2, the beverage manufacturing apparatus 10 may discharge the water W that is heated, through the ejector 190.

In detail, the pump 140 is driven when a first inlet of the first valve 130 connected to the first flow path 210 is open and a second inlet of the first valve 130 connected to the air inflow path 240 is closed. As the pump 140 is driven, the water W contained in the container 110 may be guided along the first flow path 210 to flow toward the first valve 130, the water W output from the outlet of the first valve 130 may flow toward the heat exchanger 150. The water W may be heated in the heat exchanger 150 to a preset temperature and then input to the second valve 170. The second valve 170 may open a first outlet connected to the ejection flow path 230 and close a second outlet connected to the circulation flow path 250, thereby allowing the water W that is heated to flow toward the ejection flow path 230. Accordingly, the water W that is heated may be guided by the ejection flow path 230 to flow toward the ejector 190 and then discharged through the ejector 190.

Figure 3:
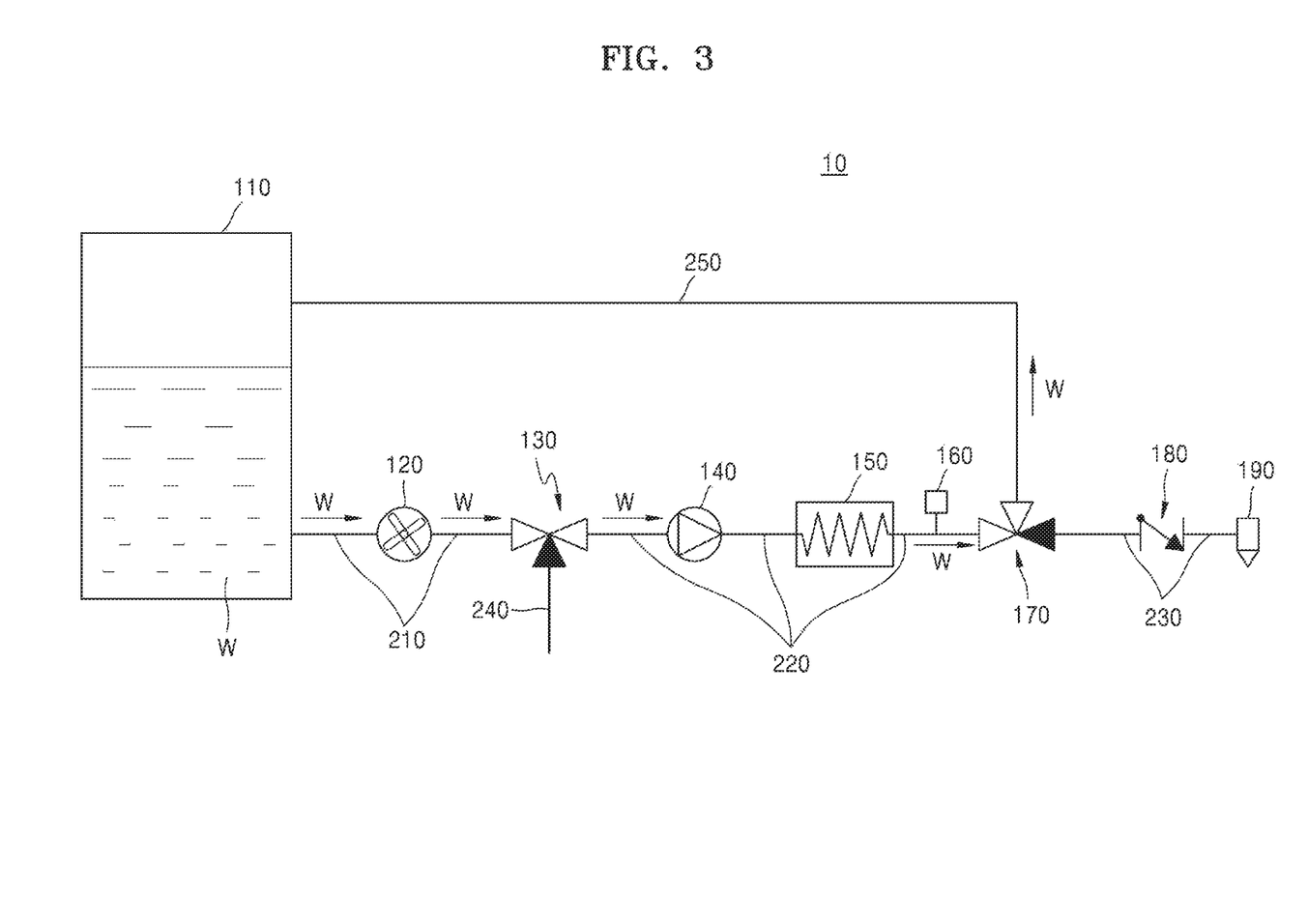

Referring to FIG. 3, the beverage manufacturing apparatus 10 may circulate the water W back to the container 110.

In detail, the pump 140 is driven when the first inlet of the first valve 130 connected to the first flow path 210 is open and the second inlet of the first valve 130 connected to the air inflow path 240 is closed. As the pump 140 is driven, the water W contained in the container 110 may be guided by the first flow path 210 to flow toward the first valve 130. The water W output from the outlet of the first valve 130 may be guided by the second flow path 220 to flow toward the heat exchanger 150. The water W heated by the heat exchanger 150 may be guided by the second flow path 220 to flow in the second valve 170. The second valve 170 may open the second outlet connected to the circulation flow path 250 and close the first outlet connected to the ejection flow path 230, thereby allowing the water W to flow toward the circulation flow path 250. The water W may be guided by the circulation flow path 250 and collected in the container 110.

In some embodiments, to determine the flow direction of the water W by using the second valve 170, the information about the temperature of the water W detected by the temperature sensor 160 may be used. In other words, the temperature sensor 160 may detect the temperature of the water W output from the heat exchanger 150 and transmit the detected temperature to the controller. When the detected temperature is determined to be out of a preset normal temperature range, the controller may open an outlet of the second valve 170 connected to the circulation flow path 250 to collect the water W in the container 110.

Furthermore, in some embodiments, to determine the flow direction of the water W through the second valve 170, information about the pressure detected by the pressure sensor (see 171 of FIG. 8) of the second valve 170 may be used. In other words, the pressure sensor may detect the pressure in the flow path and transmit the detected pressure to the controller. When the detected pressure is determined to be out of a preset normal pressure range, the controller may open the outlet of the second valve 170 connected to the circulation flow path 250 to collect the water W in the container 110.

Figure 4:
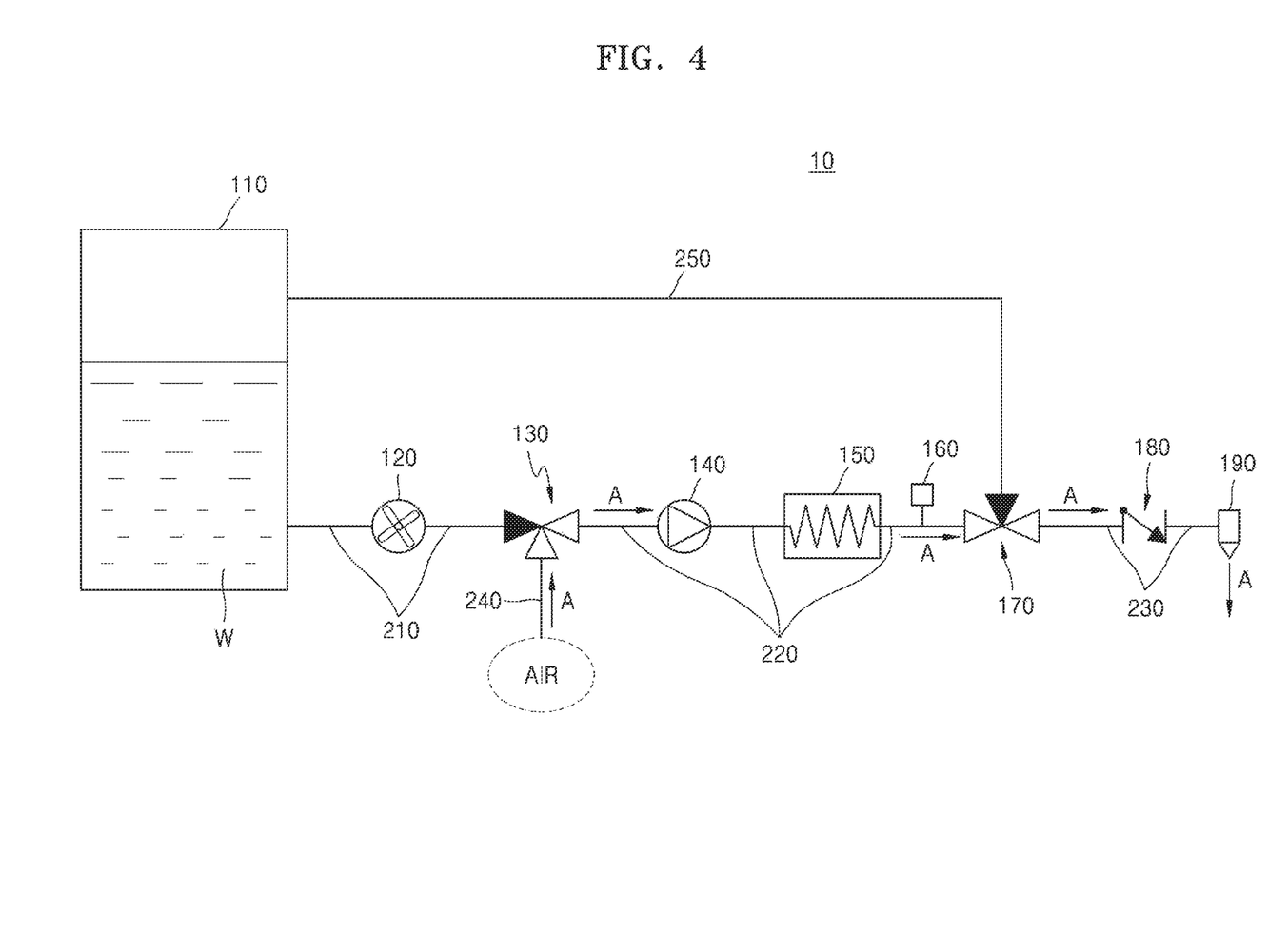

Referring to FIG. 4, the beverage manufacturing apparatus 10 may allow the air A to flow toward the ejector 190 to remove remaining water in the flow path.

In detail, to allow the outside air to flow in, the pump 140 is driven when the first inlet of the first valve 130 connected to the first flow path 210 is closed and the second inlet of the first valve 130 connected to the air inflow path 240 is open. As the pump 140 is driven, the air A may flow in the second inlet of the first valve 130 along the air inflow path 240, and the air A flowing in the outlet of the first valve 130 may flow in the second valve 170 by passing through the heat exchanger 150. As the second valve 170 opens the first outlet connected to the ejection flow path 230 and closes the second outlet connected to the circulation flow path 250, the air A may be guided by the ejection flow path 230 to flow toward the ejector 190.

According to the present embodiment, in a process in which the air A flows along the second flow path 220, the ejection flow path 230, and the ejector 190, the water W and the foreign materials remaining in the flow path may be discharged to the outside through the ejector 190, and thus contamination in the flow path may be prevented. Furthermore, in a process of discharging the air A through the ejector 190, the foreign materials adsorbed in the ejector 190 may be removed, and thus problems that the pressure of the flow path is increased due to the clogging of the ejector 190 and the ejector 190 is contaminated may be prevented.

Figure 5:
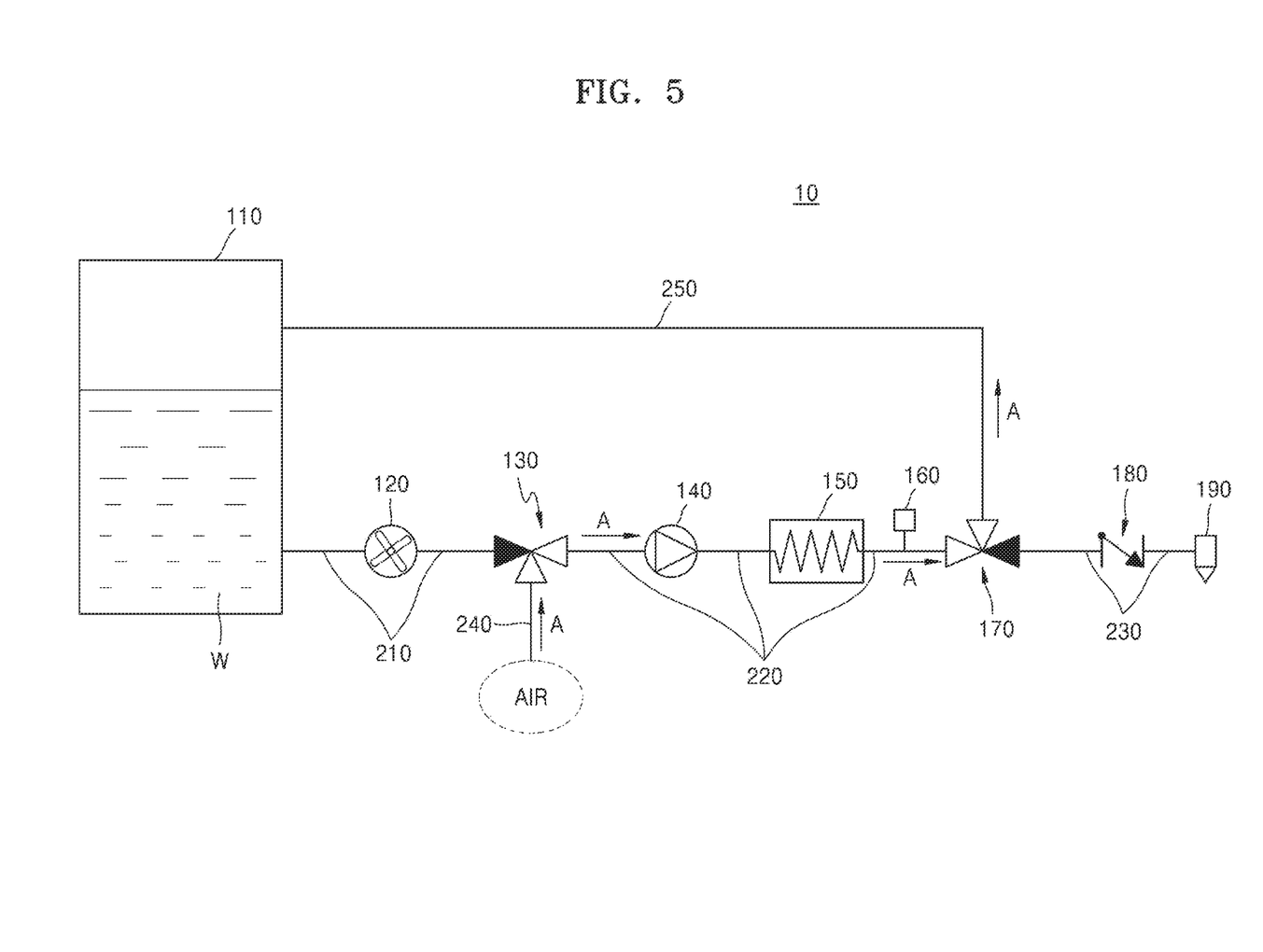

Referring to FIG. 5, the beverage manufacturing apparatus 10 may allow the air A to flow toward the circulation flow path 250 to remove the remaining water in the circulation flow path 250.

In detail, the pump 140 is driven to allow the outside air to flow in when the first inlet of the first valve 130 connected to the first flow path 210 is closed and the second inlet of the first valve 130 connected to the air inflow path 240 is open. As the pump 140 is driven, the air A may flow in the second valve 170 through the heat exchanger 150. The second valve 170 may allow the air A to be collected in the container 110 through the circulation flow path 250 by opening the second outlet connected to the circulation flow path 250 and closing the first outlet connected to the ejection flow path 230.

According to the present embodiment, in a process in which the air A flows through the second flow path 220 and the circulation flow path 250, the water W and the foreign materials remaining in the flow path may be removed, and thus contamination in the flow path may be prevented.

In some embodiments, as described in FIGS. 4 and 5, in the process of removing the remaining water in the flow path by flowing the air A in, the heat exchanger 150 may heat the air A to a certain temperature to increase fluidity of the air A.

Furthermore, according to the present embodiment, the beverage manufacturing apparatus 10 may sequentially perform circulating the water W until the water W output from the heat exchanger 150 is heated within a preset temperature range, as described with reference to FIG. 3, manufacturing beverage by discharging the water W that is heated to the preset temperature range through the ejector 190, as described with reference to FIG. 2, removing the remaining water in the ejection flow path 230 and the ejector 190, as described with reference to FIG. 4, and removing the remaining water in the circulation flow path 250, as described with reference to FIG. 5.

Figure 6:
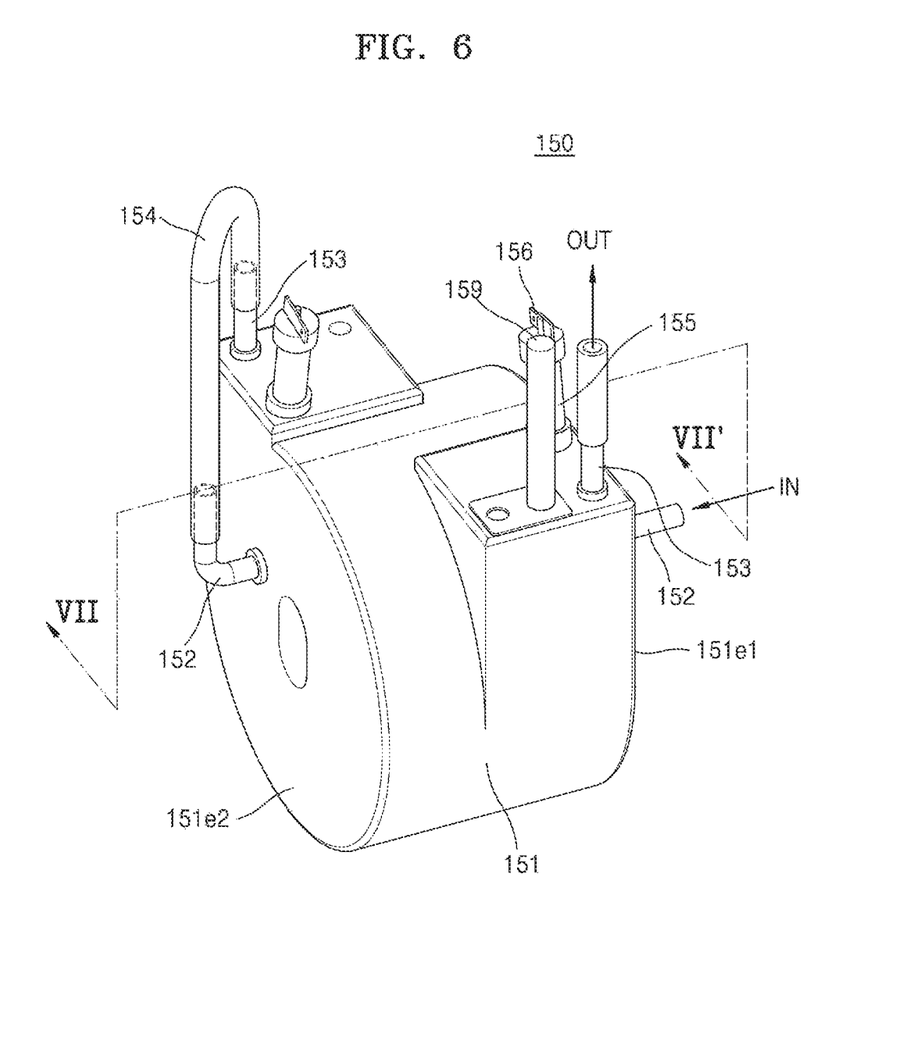
FIG. 6 is a perspective view of a heat exchanger according to an embodiment.
Figure 7:
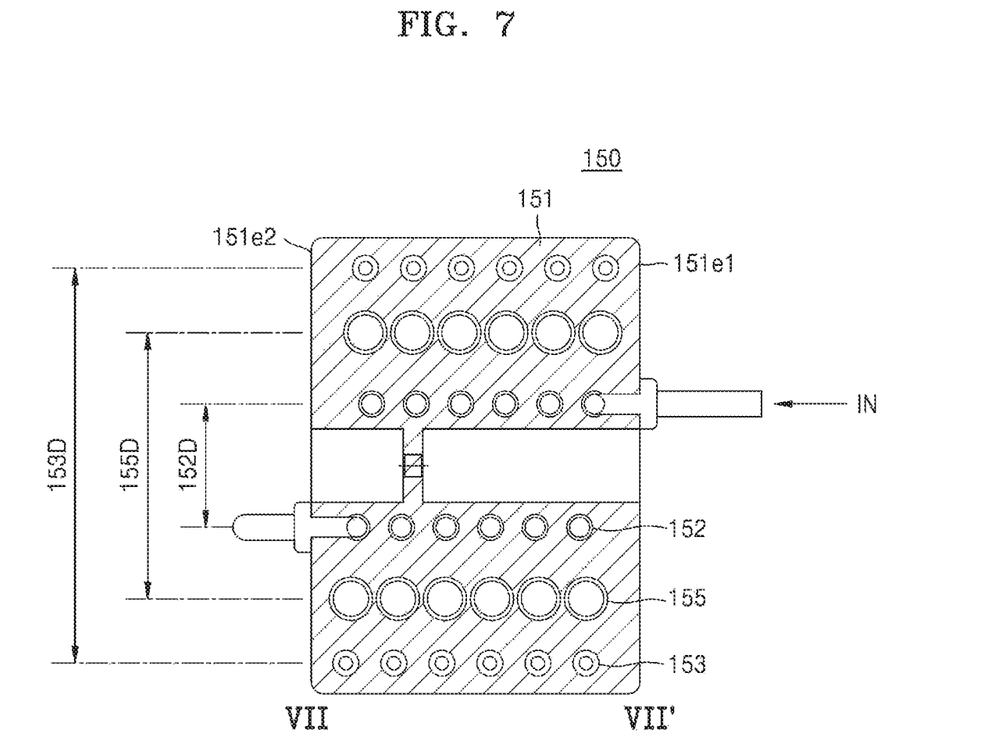
FIG. 7 is a cross-sectional view of a heat exchanger taken along line VII-VII' of FIG. 6.

FIG. 6 is a perspective view of the heat exchanger 150 according to an embodiment. FIG. 7 is a cross-sectional view of the heat exchanger 150 taken along line VII-VII' of FIG. 6.

Referring to FIGS. 6 and 7, the heat exchanger 150 may include a body 151, a first pipe 152, a second pipe 153, a connection tube 154, and a heater 155.

The first pipe 152 and the second pipe 153 may be installed in the body 151 and may provide a path through which a fluid flows in the heat exchanger 150. The second pipe 153 may be connected to the first pipe 152 to have fluid communication and may receive the fluid output from the first pipe 152. As illustrated, the fluid transferred from the first valve 130 of FIG. 1 may flow in the first pipe 152 and may be heated while sequentially passing through the first pipe 152 and the second pipe 153, and the heated fluid may be output through an outlet of the second pipe 153. However, in some embodiments, unlike the illustration, the fluid transferred from the first valve 130 of FIG. 1 may flow in the second pipe 153 and then flow out of the first pipe 152.

The flow directions of the fluid in the first pipe 152 and the second pipe 153 may be opposite to each other. In other words, the first pipe 152 may guide the fluid in a first direction from a first end portion 151e1 of the body 151 to a second end portion 151e2 opposite to the first end portion 151e1, and the second pipe 153 may guide the fluid transferred from the first pipe 152 in a second direction, for example, a direction from the second end portion 151e2 to the first end portion 151e1, that is opposite to the first direction.

In some embodiments, the first pipe 152 and the second pipe 153 may protrude from the body 151, and an end portion of the outlet of the first pipe 152 and an end portion of the inlet of the second pipe 153 may be connected to each other by the connection tube 154. However, in another embodiment, unlike the illustration in the drawings, the first pipe 152 and the second pipe 153 may be directly connected to each other in the body 151. In this case, the connection tube 154 may be omitted.

In some embodiments, the first pipe 152 and the second pipe 153 may have a helical shape. The first pipe 152 and the second pipe 153 of a helical shape may increase a time for the fluid flowing in the heat exchanger 150 so that the fluid may be heated for a longer period of time. In this state, the second pipe 153 is arranged spaced farther from a center portion of the body 151 than the first pipe 152, and a helical diameter 153D of the second pipe 153 may be greater than a helical diameter 152D of the first pipe 152.

The heater 155 may be at least partially embedded in the body 151. For example, the heater 155, as a heater having a pipe shape, may have a structure in which a heat coil to be heated by a resistance heating method may be arranged in a protection tube. When power is supplied through terminals 156 connected to both end portions of the heat coil, the fluid in the first pipe 152 and the second pipe 153 may be heated by heat generated from the heat coil.

The heater 155 may be provided between the first pipe 152 and the second pipe 153. The heater 155 may be arranged close to the first pipe 152 and the second pipe 153, and thus the fluid in the first pipe 152 and the fluid in the second pipe 153 may be effectively heated.

In some embodiments, the heater 155 may have a helical shape. In this state, a helical diameter 155D of the heater 155 may be greater than the helical diameter 152D of the first pipe 152 and less than the helical diameter 153D of the second pipe 153.

The heat exchanger 150 may include a temperature sensor 159 installed on the body 151. For example, the temperature sensor 159 may be used to detect overheat of the heat exchanger 150 or determine whether the heat exchanger 150 reaches a target temperature range during a preheating operation of the heat exchanger 150.

According to the present embodiment, the fluid in the heat exchanger 150 is heated while passing through the first pipe 152 and the second pipe 153 that guide the fluid in the opposite directions, thereby improving heating efficiency of the heat exchanger 150.

FIG. 8 is a perspective view of the second valve 170 according to an embodiment.

Referring to FIG. 8, the second valve 170 may be a four-way valve having one inlet and three outlets. The second valve 170 may have one inlet 173 connected to the second flow path 220, a first outlet 17501 connected to the ejection flow path 230, and a second outlet 17502 and a third outlet 17503 both connected to the circulation flow path 250.

The second valve 170 may include the pressure sensor 171. The pressure sensor 171 may be configured to detect pressure in the ejection flow path 230. The second outlet 17502 may be open or closed depending on the information about the temperature of the water W detected by the temperature sensor 160, and the third outlet 17503 may be open or closed depending on the information about the pressure in the flow path detected by the pressure sensor 171.

Figure 9:
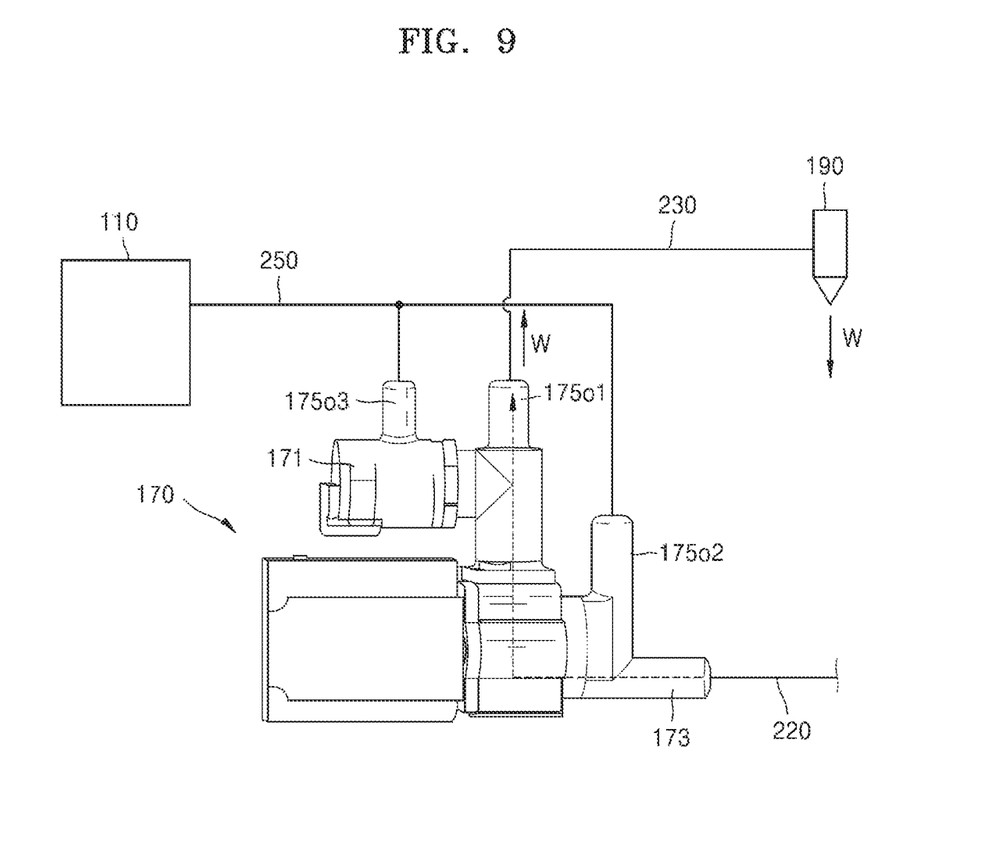
FIGS. 9 to 11 each illustrate an operation method of an apparatus for manufacturing beverage according to an embodiment.
Figure 10:
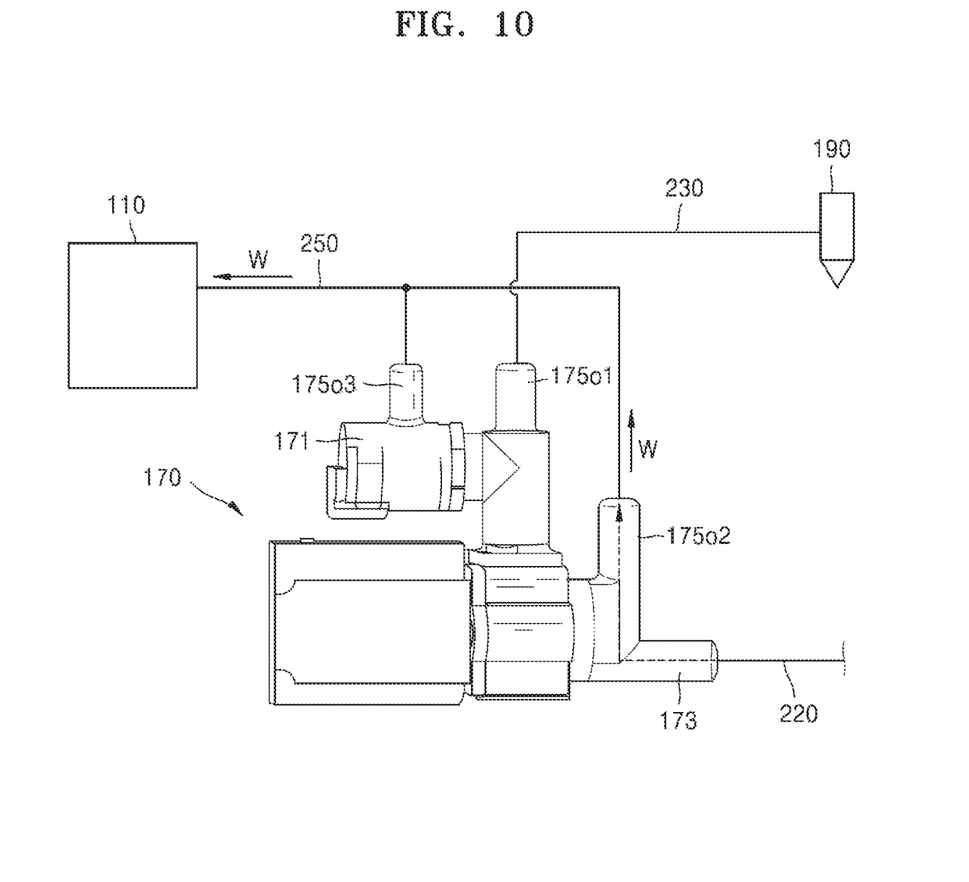
Figure 11:
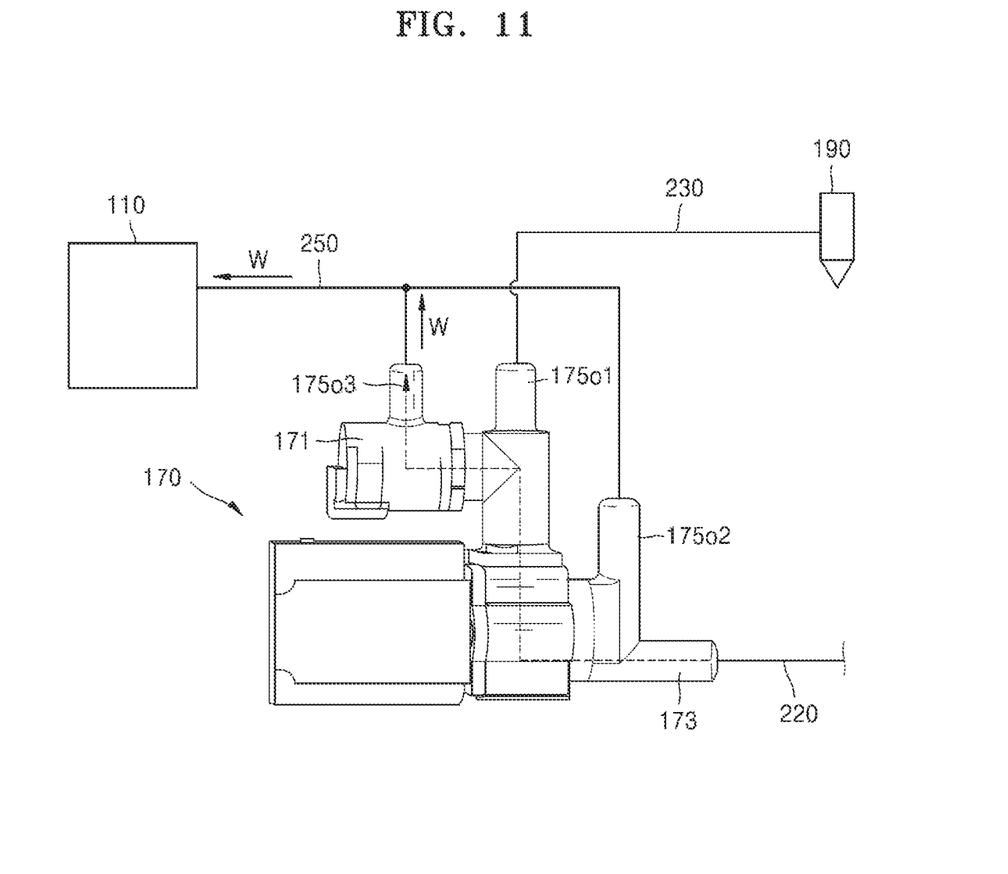
Figure 12:
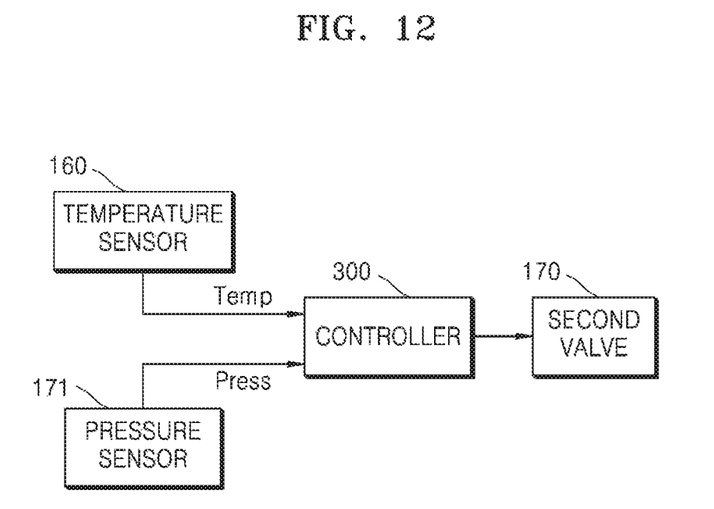
FIG. 12 is a block diagram of a part of an apparatus for manufacturing beverage according to an embodiment.

FIGS. 9 to 11 each illustrate an operation method of a beverage manufacturing apparatus according to an embodiment. FIG. 12 is a block diagram of a part of a beverage manufacturing apparatus according to an embodiment.

Referring to FIGS. 9 and 12, the second valve 170 may allow the water W to flow toward the ejector 190 when the temperature of the water W heated by the heat exchanger 150 is within the normal temperature range and abnormal pressure is not detected in the flow path.

In detail, the temperature sensor 160 and the pressure sensor 171 may respectively transmit, to the controller 300, information Temp about the temperature of the water W heated by the heat exchanger 150 and information Press about the pressure in the flow path. The controller 300 may the second valve 170 to open the first outlet 17501 of the second valve 170 when the temperature sensor 160 determines that the detected temperature is within the normal temperature range and the pressure sensor 171 determines that the detected pressure is within the normal pressure range. As the first outlet 17501 is open, the water W that is heated within the normal temperature range may be discharged through the ejector 190.

Referring to FIGS. 10 and 12, the second valve 170 may allow the water W to flow toward the circulation flow path 250 when the temperature of the water W heated by the heat exchanger 150 is out of the normal temperature range.

In detail, although no abnormal pressure is detected by the pressure sensor 171, when the temperature sensor 160 determines that the detected temperature is out of the normal temperature range, the controller 300 may drive the second valve 170 to open the second outlet 17502 of the second valve 170. As the second outlet 17502 is open, the water W does not flow toward the ejection flow path 230 and may be collected in the container 110 through the circulation flow path 250.

Referring to FIGS. 11 and 12, the second valve 170 may allow the water W to flow toward the circulation flow path 250 when abnormal pressure is detected in the flow path.

In detail, for example, when the ejector 190 is clogged due to foreign materials and thus pressure in the flow path excessively increases, the pressure sensor 171 may determines that the detected pressure is out of the normal pressure range. In this case, the controller 300 may drive the second valve 170 to close the first outlet 17501 to prevent the flow of the water W toward the ejection flow path 230. The controller 300 may open the third outlet 17503 of the second valve 170 to collect the water W in the container 110.

According to the present embodiment, as the apparatus for manufacturing beverage ejects water heated within a preset temperature range, beverages such as coffee and tea having a uniform temperature may be manufactured. Furthermore, as the apparatus for manufacturing beverage determines whether to eject water based on the detected pressure information, occurrence of damage to the apparatus due to overpressure and a safety accident due to the ejection of fluid in an overpressure state may be prevented.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

I claim:

1. An apparatus for manufacturing beverage, the apparatus comprising:
a container configured to accommodate water and comprising an outlet;
a first valve connected to the container via a first flow path for guiding a fluid output from the container and to outside air via an air inflow path;
a second valve connected to the first valve via a second flow path for guiding the fluid output from the first valve;
a heat exchanger installed on the second flow path for connecting the first valve to the second valve, wherein the heat exchange comprises:
a body including a first end portion and a second end portion, the second end portion being opposite to the first end portion;
a first pipe installed in the body and guiding the fluid in a first direction from the first end portion of the body to the second end portion of the body;
a second pipe installed in the body and guiding the fluid output from the first pipe in a second direction opposite to the first direction; and
a heater embedded in the body and having a pipe shape, and the heater is provided between the first pipe and the second pipe and arranged close to the first pipe and the second pipe such that the fluid in the first pipe and the fluid in the second pipe is heated;
an ejector connected to the second valve via an ejection flow path for guiding the fluid output from the second valve and discharging the fluid therethrough;
a circulation flow path for connecting the second valve to the container and guiding the fluid output from the second valve to flow toward the container; and
a controller that controls the first valve and the second valve,
wherein the first valve further comprises a first flow path switching valve configured to allow a flow of water through the first flow path or air through the air inflow path that communicates with the outside air,
wherein the second valve further comprises a second flow path switching valve configured to allow the air inputted to the second valve to be output through the ejection flow path or to the circulation flow path,
wherein the second valve further comprises:
an inlet connected to the second flow path and configured to allow an inflow of water or air output from the first valve;
a first outlet connected to the ejection flow path; and
a second outlet connected to the circulation flow path, and
wherein the controller is configured to control opening/closing of the first outlet of the second valve and opening/closing of the second outlet of the second valve to allow the air flowing in through the inlet of the second valve to be output to the ejection flow path or the circulation flow path such that remaining water in the ejection flow path or remaining water in the circulation flow path is removed during an inflow of air to the inlet of the second valve.

2. The apparatus of claim 1, wherein the heat exchanger further comprises a temperature sensor that detects a temperature of the fluid output from the heat exchanger.

3. An apparatus for manufacturing beverage, the apparatus comprising:

a container configured to accommodate water;

a first valve connected to the container through a first flow path for guiding the water output from the container and to outside air via an air inflow path;

a second valve connected to the first valve via a second flow path for guiding the fluid output from the first valve;

an ejector connected to the second valve via an ejection flow path for guiding the fluid output from the second valve and discharging the fluid therethrough;

a circulation flow path connecting the second valve to the container and guiding the fluid output from the second valve to the container;

a heat exchanger installed on the second flow path, wherein the heat exchange exchanger comprises:
  a first pipe guiding the fluid in a first direction;
  a second pipe guiding the fluid output from the first pipe in a second direction opposite to the first direction;
  a heater having a pipe shape, wherein the heater is provided between the first pipe and the second pipe and arranged close to the first pipe and the second pipe such that the fluid in the first pipe and the fluid in the second pipe is heated;

a temperature sensor that detects a temperature of the fluid output from the heat exchanger;

a pressure sensor that detects pressure in the ejection flow path; and a controller that controls the first valve and the second valve, wherein the first valve comprises a first flow path switching valve configured to allow a flow of water through the first flow path or air through the air inflow path that communicates with the outside air, and allow water or air to be output to the second flow path, wherein the second valve comprises a second flow path switching valve configured to allow the fluid inputted to the second valve to be output through the ejection flow path or the circulation flow path;

wherein the second valve further comprises:

an inlet connected to the second flow path and configured to allow an inflow of water or air output from the first valve;

a first outlet connected to the ejection flow path;

a second outlet connected to the circulation flow path; and a third outlet connected to the circulation flow path, wherein the second valve is configured to:
  when the water having passed through the first valve and the heat exchanger is provided, allow the water inputted to the inlet of the second valve to the ejection flow path or the circulation flow path; and
  when the air having passed through the first valve and the heat exchanger is provided, allow the air inputted to the inlet of the second valve to the ejection flow path or the circulation flow path, and wherein the controller is further configured to, during an inflow of the water to the inlet of the second valve:
  open the first outlet when the temperature of the water detected by the temperature sensor is within a preset normal temperature range and the pressure detected by the pressure sensor is within a preset normal pressure range;
  open the second outlet when the temperature of the water detected by the temperature sensor is out of the preset normal temperature range; and
  close the first outlet and open the third outlet when the pressure detected by the pressure sensor is out of the preset normal pressure range.

4. The apparatus of claim 3, further comprising:
a check valve installed on the ejection flow path and configured to prevent backflow of the fluid in the ejection flow path.

\* \* \* \* \*